Patented July 24, 1951

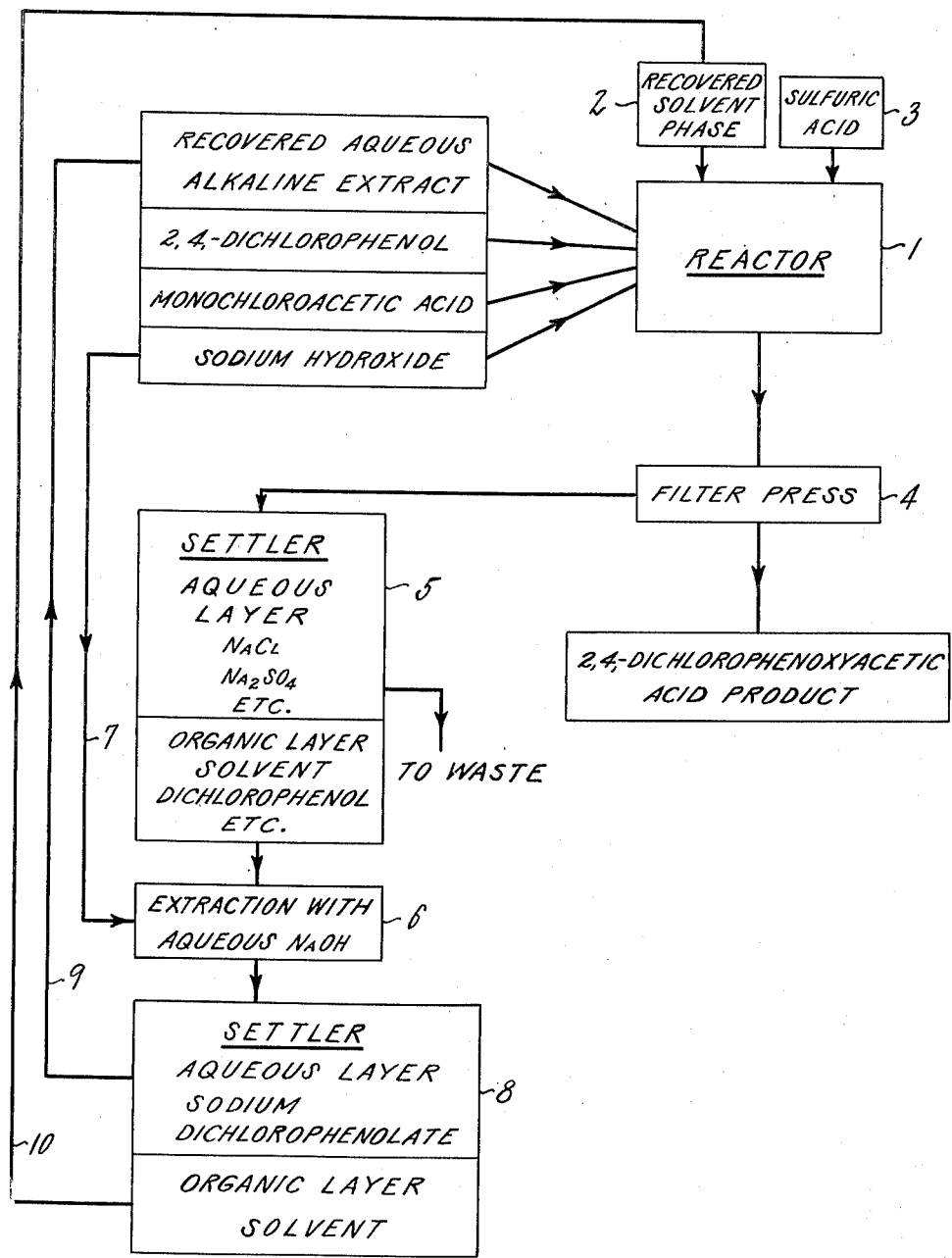

2,561,547

UNITED STATES PATENT OFFICE 2,561,547

PREPARATION OF POLYCHLOROPHENOXY ACETIC ACIDS

John C. R. Warren, Elmira, Ontario, Canada, assignor to United States Rubber Company, New York, N. Y., a corporation of New Jersey Application August 13, 1947, Serial No. 768,387

4 Claims. (Cl. 260—521)

This invention relates to the preparation of polychlorophenoxy acetic acids and particularly to the preparation of 2,4-dichlorophenoxyacetic acid which is becoming of increasing importance as a plant hormone and weed killer.

The principal object of the present invention is to provide an improved method of preparing aryloxyaliphatic acids, particularly 2,4-dichlorophenoxyacetic acid. Another object is to provide a method whereby such compounds are obtained in greater yields and are of a superior quality than when the conventional method is employed. Another object is to provide a method whereby the unreacted aromatic nuclear-substituted-hydroxy compound is recovered in a form suitable for re-use. Another object is to eliminate complicated and expensive purification of the product 2,4-dichlorophenoxyacetic acid.

2,4-dichlorophenoxyacetic acid was first reported by Pokorny in 1941 (J. A. C. S., 63, 1768), who evaporated an aqueous solution of 2,4-dichlorophenol, monochloroacetic acid and sodium hydroxide to dryness. Previously Koelsch, in 1931 (J. A. C. S., 53, 304), recommended the preparation of aryloxyacetic acids as an identification method for phenols, by reacting the phenol with monochloroacetic acid in aqueous sodium hydroxide. Hardman, in 1946 (U. S. Patent 2,410,782), prepared substituted aryloxyacetic acids by reacting the substituted phenols with monochloroacetic acid in an aqueous solution of sodium hydroxide. In order to obtain a pure product, prior workers such as Pokorny and Hardman proceeded to recrystallize their products from an organic solvent. In the conventional method of making 2,4-dichlorophenoxyacetic acid, a considerable amount of water is employed to keep the reaction mixture fluid throughout the course of the reaction. The alkali metal salt, of the aryloxyaliphatic acid which is formed, is converted to the free acid by the addition of a dilute aqueous mineral acid.

In producing 2,4-dichlorophenoxyacetic acid by conventional methods such as have just been described, the product obtained smells very strongly of dichlorophenol and melts at 133–138° C. The yield based on monochloroacetic acid is 70 to 80 per cent. To obtain a suitable product the quality must be improved by recrystallization from a solvent, by removing organic impurities through a vacuum or steam distillation or by reprecipitation from one of its salts. These purification procedures add to the expense of manufacture and moreover entail a loss of the 2,4-dichlorophenoxyacetic acid, thereby further reducing the over-all yield of the product.

The reaction involved may be expressed as follows:

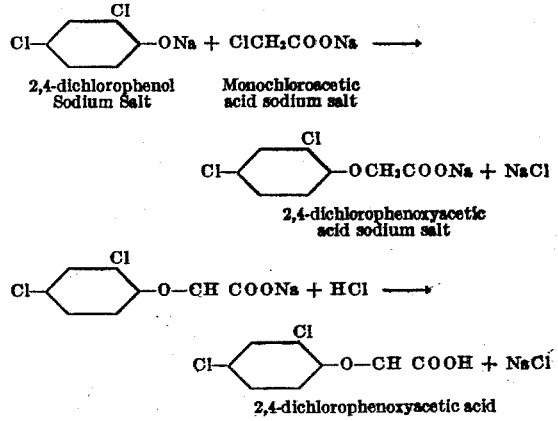

In this reaction, dichlorophenol does not appear to react to produce by-products to any appreciable extent.

Following the neutralization of the reaction mixture obtained from the conventional preparation, a portion of the unreacted dichlorophenol separates as such while the balance of it remains associated with the product 2,4-dichlorophenoxyacetic acid, contaminating the same and necessitating expensive purification steps which entail loss of valuable product. The present invention provides a simple, efficient and economical process whereby 2,4-dichlorophenoxy-acetic acid of high quality is produced in an improved yield.

I have discovered a simplified and efficient process whereby the initial reaction product is obtained in improved yield and of superior quality without going to the extra expense and difficulty of further purification such as by recrystallization, steam distillation, vacuum distillation, or reprecipitation. My improved process involves reacting the alkali metal salt of the aromatic nuclear-substituted-hydroxy compound, such as the sodium salt of dichlorophenol, and the alkali metal salt of the alpha-halogenated aliphatic carboxylic acid, such as sodium chloroacetate, in a reaction medium comprising water, admixing with the resulting reaction mixture a substantially water-insoluble organic liquid which is a solvent for the aromatic nuclear-substituted-hydroxy compound, acidifying the resulting mixture, and separating precipitated aryloxyaliphatic acid from the acidified mixture.

The process of my invention is highly advantageous because any unreacted aromatic nuclear-substituted-hydroxy compound, which of course is liberated upon the acidification of the mixture, is retained in solution in the water-insoluble organic liquid and may be recovered for use in a subsequent reaction. I have found that very advantageous results are obtained by separating the residual liquid mixture, left upon separation of the precipitated product, into an organic layer containing the solvent, and the unreacted aromatic nuclear-substituted-hydroxy compound and an aqueous layer which is discarded, extracting the organic layer with aqueous alkali metal hydroxide solution, recycling the aqueous extract thus obtained to the reaction step, and recycling the raffinate or extracted organic layer to the admixing step and employing it as the source of the organic liquid which is admixed with the reaction mixture following reaction and prior to the acidification step.

My invention is based upon the discovery that markedly improved results are obtained in the manufacture of aryloxyaliphatic acids, especially 2,4-dichlorophenoxyacetic acid, if an organic solvent of the type mentioned above and described more fully below is admixed with the reaction mixture after reaction but prior to the acidification step. Upon acidification of the mixture containing such a solvent, the unreacted nuclear-substituted-hydroxy compound, such as 2,4-dichlorophenol, is selectively dissolved in the organic solvent and thus is prevented from appearing in the aryloxyaliphatic acid product. Upon extraction of the solvent containing this aromatic nuclear-substituted-hydroxy compound with aqueous alkali metal hydroxide solution the nuclear-substituted-hydroxy compound is dissolved by the aqueous alkali and thereby removed from the solvent, the resulting extract being a very convenient source of a portion of the alkali metal salt of the nuclear-substituted-hydroxy compound and also a source of the water required for the reaction. This extract is, of course, only a minor source of the alkali metal salt for the next reaction, while it is a major source of the water medium for the next reaction. The extracted solvent layer, thus substantially freed from nuclear-substituted-hydroxy compound, is very conveniently employed as a source of the solvent added prior to the acidification step.

In a typical procedure for making 2,4-dichlorophenoxyacetic acid in accordance with the present invention, an alkali metal salt of 2,4-dichlorophenol and an alkali metal salt of chloroacetic acid are caused to undergo reaction by refluxing in water solution until the reaction is substantially complete. There is then admixed with the reaction mixture a substantially water-insoluble organic liquid which is a solvent for 2,4-dichlorophenol. The solvent may be added while the reaction mixture is at any convenient temperature. The temperature at which the solvent is added is not critical but may conveniently range from 70 to 90° C. The reaction mixture is then acidified, while undergoing vigorous agitation, with a suitable acid, preferably dilute aqueous sulfuric acid, and the resulting mixture is then cooled to room temperature. When the reaction mixture is acidified at an elevated temperature, which preferably ranges from 70° to 90° C., it forms two layers, all of the 2,4-dichlorophenoxyacetic acid being dissolved in the two phases. On cooling, an emulsion is formed and from this emulsion 2,4-dichlorophenoxyacetic acid is precipitated beginning at 50–60° C. This 2,4-dichlorophenoxyacetic acid appears to be retained in the organic phase of the emulsion and consists of fairly uniform fine particles while the balance of the 2,4-dichlorophenoxyacetic acid, some 10 to 20% of the total amount thereof, still is dissolved in the organic liquid. The organic layer may contain from 2 to 15% 2,4-dichlorophenoxyacetic acid, based on the weight of the organic layer, dissolved therein, depending upon the amount of dichlorophenol and other impurities dissolved in it. The amount of dichlorophenol in the organic liquid may vary from 5 to 20% based on the weight of the organic layer.

The cooled mixture is next treated to separate the precipitated 2,4-dichlorophenoxyacetic acid. The residual liquid mixture is then separated into two layers under the influence of gravity. The organic layer, comprising essentially the organic liquid having dissolved therein the dichlorophenol and some 2,4-dichlorophenoxyacetic acid, separates readily from the aqueous layer and the two layers are separately withdrawn. The organic layer is extracted with a portion or all of the aqueous sodium hydroxide to be employed in making the next batch and in this way the dichlorophenol is extracted from the organic layer and an extract is formed which is very suitable for use in making up the next charge to the reactor. The organic phase which has been extracted is employed as the source of the organic solvent added to the reaction mixture before the acidification step.

The acidification of the reaction mixture is preferably conducted at a temperature which is sufficiently high that the mixture is entirely liquid after acidification, i. e., so that no solidification of any components thereof takes place. The temperature at which the mixture is acidified preferably ranges from 70° to 90° C. The acidified mixture is preferably cooled to a temperature below 60° C. and still more preferably to below 40° C., say down to room temperature or even lower, to effect precipitation of the 2,4-dichlorophenoxyacetic acid product. The lower the temperature to which the mixture is cooled, the more completely is the 2,4-dichlorophenoxyacetic acid thrown out of solution. However, the cooling should not be carried to so low a temperature that solidification of other materials present, especially water, takes place.

Preferably the mixture is vigorously agitated during the reaction, during the addition of the organic solvent and during the acidification. In some cases the mixture may be sufficiently agitated during the reaction as a result of the boiling action.

The reaction temperature conveniently is the boiling point of the mixture which may range from 95° C. at atmospheric pressure upwards depending upon the pressure. It is preferred to use as high a temperature as is feasible in order to promote rapid reaction, and in some cases the reaction may be conducted under pressure in order to secure higher reaction temperatures.

Incorporation of the water-insoluble organic solvent with the reaction mixture prior to the acidification step in accordance with the present invention has the advantages that the powder form of the 2,4-dichlorophenoxyacetic acid produced is more desirable and that it makes practical the use of excess dichlorophenol in the reaction which effects an improvement in the yield of the product. My invention takes advantage of the discovery that the product 2,4-dichlorophenoxyacetic acid is far less soluble in the solvent than is the dichlorophenol whereby the dichlorophenol is prevented from contaminating the 2,4-dichlorophenoxyacetic acid product. The 2,4-dichlorophenoxyacetic acid is appreciably soluble in the organic liquid and a certain amount of it inevitably is recycled from batch to batch by reason of its being extracted from the organic layer by the aqueous sodium hydroxide. However, in spite of this the yields of 2,4-dichlorophenoxyacetic acid obtained in accordance with the present invention are very good.

The organic liquid which is employed in the practice of the present invention should have the following characteristics. It should be substantially water-insoluble so that it forms a separate liquid hase under the conditions of acidification and cooling and so that losses due to solubility of the solvent in water are reduced. It should be inert with respect to the other materials present. It should be a good solvent for the aromatic nuclear-substituted-hydroxy compound such as 2,4-dichlorophenol so that then when the reaction mixture is acidified the liberated phenolic compound will go preferentially into the organic liquid phase. It should exhibit a considerably lower solubility for the aryloxyaliphatic acid product than for the phenolic compound. Examples of suitable solvents are hydrocarbons such as paraffins, olefins, cycloparaffins, monocyclic aromatic hydrocarbons such as benzene, toluene and xylene, and halogenated hydrocarbons such as halogenated paraffins and olefins, for example carbon tetrachloride, perchlorethylene, ethylene dichloride, etc., halogenated cycloparaffins such as chlorocyclohexane, halogenated monocyclic hydrocarbons such as monochlorobenzene, orthodichlorobenzene, etc. I prefer to use monochlorobenzene when synthesizing 2,4-dichlorophenoxyacetic acid from dichlorophenol and chloroacetic acid.

The organic solvent which is used should be liquid at temperatures ranging from the temperature at which the cooling step is conducted up to the temperature at which the reaction is conducted. Usually organic liquids having a boiling point of from 70° to 200° C. are employed.

The amount of water employed in the reaction mixture is preferably sufficient to keep the reaction mixture fluid throughout the course of the reaction and to keep materials other than the aryloxyaliphatic acid, and possibly some alkali metal salt of the phenol, from separating out in subsequent steps of the process. Less desirably the reaction may be carried out by reducing the amount of water and allowing the mixture to solidify; then, at the completion of the reaction, water and solvent are added and the mixture is agitated before acidification. As the amount of water in the reaction mixture is increased, the product yield decreases slowly and it is therefore desirable to use as small an amount of water as is consistent with good operation. The amount of the solvent which is added before the acidification step may vary within wide limits. Usually the ratio of added solvent to water present in the reaction mixture will vary from 1:3 to 5:1 by weight.

The less solvent used in my process the greater is the residual dichlorophenol content of the product. The more solvent used the lower is the residual dichlorophenol content but also the lower the productivity per unit volume. In commercial practice a compromise is effected between the two extremes so that residual dichlorophenol in the product is kept suitably low and productivity of the equipment is kept suitably high.

The proportions of the aromatic nuclear-substituted-hydroxy compound and of the alpha-halogenated aliphatic carboxylic acid employed may vary widely but it is preferred to employ a substantial molar excess of the former. For example in the preparation of 2,4-dichlorophenoxyacetic acid in accordance with the present invention I find it convenient to employ from 1.2 to 2.5 mols of 2,4-dichlorophenol per mol of chloroacetic acid. I have found that the use of 2 or more mols of the phenolic compound per mol of the carboxylic acid is highly desirable since it enables yields as high as 85% to be obtained. As explained above, the use of excess dichlorophenol which is made practical by the present invention results in a very substantial improvement in the yield of the desired product.

While the invention is preferably applied to the production of 2,4-dichlorophenoxyacetic acid from 2,4-dichlorophenol and chloroacetic acid, it may be employed to produce other aryloxyaliphatic acids. For example any aromatic nuclear-substituted-hydroxy compound such as phenols, cresols, xylenols, naphthols and the like, and their halogeno, alkoxy, aryloxy, amino, arylamino, nitro, carboxy, etc. derivatives, especially the nuclear-substituted derivatives of aromatic nuclear-substituted-hydroxy compounds, may be used in the practice of the present invention. Examples of such other phenolic compounds are beta-naphthol, hydroquinone, p-hydroxy diphenylamine, and p'-amino p-hydroxydiphenyl. Likewise in place of monochloroacetic acid, other alpha-halogenated aliphatic acids may be used, e. g. dichloroacetic acid, alpha-chloropropionic acid, alpha-chlorobutyric acid, etc.

While the sodium salts of the reactants such as 2,4-dichlorophenol and monochloroacetic acid are preferred on account of cheapness and availability, other alkali metal salts such as those of potassium or lithium may be employed.

The amount of alkali metal hydroxide employed in the reaction may vary widely but preferably ranges from 100 to 110 per cent of that theoretically required to neutralize all of the phenolic compound and the alpha-halogenated aliphatic acid.

In preparing the initial reaction mixture I prefer to add the alkali metal hydroxide last since otherwise lower yields are obtained. Furthermore in the interest of higher yields it is preferable to bring the reaction mixture from atmospheric temperature to reaction temperature, i. e. refluxing conditions, as rapidly as possible. This is insured by adding the alkali metal hydroxide last, since the neutralization of the reactants is highly exothermic.

The accompanying drawing portrays diagrammatically the preparation of 2,4-dichlorophenoxyacetic acid in accordance with the present invention. As is illustrated in the drawing, the several ingredients making up the reaction mixture, namely 2,4-dichlorophenol, monochloroacetic acid, and recycled aqueous alkaline extract, together with additional water and sodium hydroxide as needed, are charged to the reactor 1. The sodium hydroxide is added last in order that the charge may be raised to the refluxing point as rapidly as possible. The reaction mixture is held under refluxing conditions until the reaction is substantially complete. Recycled solvent, together with any make-up solvent, is then added to the reaction mixture from supply 2 and admixed thoroughly therewith. Sulfuric acid is then added with agitation from supply 3. The resulting mixture, after cooling, may be passed to filter press 4 where the 2,4-dichlorophenoxyacetic acid product is separated in the usual manner. The filtrate is passed to settling zone 5 where it is allowed to separate into two layers, an aqueous layer which is withdrawn and discarded and an organic layer.

The organic layer separated in 5 is extracted in 6 with aqueous sodium hydroxide supplied via line 7. The resulting mixture may be separated in unit 8 into a layer of the extract which is recycled to the reaction via line 9 and a raffinate layer of the extracted solvent which is recycled via line 10 for addition to the reaction mixture after reaction but prior to acidification.

If desired, a suitable proportion of the solvent layer, i. e. the extracted solvent or raffinate, flowing in line 10, may be passed intermittently or continuously to a suitable purification unit (not shown) where impurities may be removed therefrom in any suitable way, e. g. distillation. Such re-running should be carried out at such a rate that the impurities in the solvent in the main system are kept from pyramiding. Make-up solvent may be added at any suitable point and in any suitable manner to compensate for system losses.

Similarly if impurities tend to build up to an objectionable extent in the aqueous alkaline phase, a suitable proportion of the aqueous extract, flowing in line 9, may be treated in any suitable manner to effect removal of such impurities therefrom.

Instead of filtration, any other mode of separating the precipitated product from the cooled reaction liquor such as solid-liquid centrifuging, etc. may be employed. Furthermore instead of gravity separation for effecting settling of the residual liquid in units 5 and 8, I may use any other means for effecting this separation into phases, such as liquid-liquid centrifuging.

The extraction of the organic layer with the aqueous alkali metal hydroxide solution may be carried out in any suitable manner and in any suitable equipment. Methods of conducting liquid-liquid extraction are well known in the art and need not be described in detail. In some cases I may employ continuous countercurrent liquid-liquid extraction, the organic layer being introduced at one end of the unit and the aqueous caustic at the other end and the organic phase and the caustic contacting one another countercurrently, the extract being withdrawn continuously adjacent to the end into which the organic layer is introduced and the raffinate being withdrawn continuously adjacent to the opposite end. Such extraction equipment may embody settling means within it, e. g., at the opposite end. The amounts of aqueous alkali metal hydroxide employed for the extraction should be at least sufficient to remove substantially all of the unreacted dichlorophenol or other aromatic nuclear-substituted-hydroxy compound from the organic layer.

While the process of my invention has been described herein as being conducted in a batchwise manner, it will be understood by those skilled in the art that it may with suitable modification be carried out continuously.

Following is an illustrative example of the practice of my invention.

*Example*

The aqueous alkaline extract from a previous preparation (which contains 10-50 parts by weight of 2,4-dichlorophenol, sodium salt, and 2-20 parts by weight of sodium dichlorophenoxyacetate in 500-600 parts by weight of solution) is mixed with 155 parts by weight of 2,4-dichlorophenol and 95 parts by weight of monochloroacetic acid. About 100-150 parts by weight of aqueous 50% sodium hydroxide are added and the mixture is heated to reflux as quickly as possible in an agitated vessel and held at reflux for 3 hours. To the reaction mixture at 80-90° is then added about 500-600 parts by weight of monochlorobenzene recovered from the previous run. The mixture is then acidified at 80° with 25% aqueous sulfuric acid and then cooled to room temperature. The reaction mixture is filtered and the filter cake washed with cold water. The entire filtrate is allowed to settle and the organic layer (containing principally monochlorobenzene, dichlorophenol and some 2,4-dichlorophenoxyacetic acid) which separates readily from the aqueous layer is removed and stored for further treatment. The filter cake is dried at 80-100°, weighs 165 parts and melts at 138-139°.

The monochlorobenzene solution is agitated with an equal amount of water and about 15-40 parts by weight of aqueous 50% sodium hydroxide (sufficient to make the aqueous layer alkaline). The mixture is allowed to settle and the aqueous layer separated from the organic layer. Both of these are stored for use in the next run.

The lower limit for water (aqueous alkaline extract) present during the reaction of the example 450-500 parts by weight. Below this the reaction mixture solidifies.

From the foregoing description, numerous advantages of my invention will be apparent to those skilled in the art. The method of preparation of my invention enables the obtaining of substantially better yields of the desired product than is the case with prior methods. The improved yields made possible by the method of the present invention are attributable to the fact that the invention enables the use of an excess of the phenolic compound and to the fact that the losses involved in subsequent purification of the product are eliminated because the necessity for such purification is eliminated. The yield of 2,4-dichlorophenoxyacetic acid in accordance with the present invention is frequently better than 80% based on chloroacetic acid charged and it may be as high as 85%. The product is of better quality being much freer from dichlorophenol. The method of preparation of my invention eliminates the necessity of additional purification steps with their attendant expense and loss of product. The invention permits an excess of dichlorophenol to be used and this may be recovered and recycled to complete consumption. The organic solvent may be recycled many times so that the solvent costs are low. The 2,4-dichlorophenoxyacetic acid obtained in powdered form by the practice of the invention is more desirable than the powdered 2,4-dichlorophenoxyacetic acid obtained when the organic solvent is not employed; the product is superior both physically and chemically, a particularly noticeable point of superiority being its improved color which is attributable to the retention of colored impurities in the solvent.

The reaction medium used in accordance with my invention usually and almost invariably consists of water.

As used herein the expression "chloroacetic acid" is employed in its usual sense to designate monochloroacetic acid.

My copending application Serial Number 766,209, filed August 5, 1947, which matured into Patent No. 2,480,817, issued August 30, 1949, is directed to a process of preparing aryloxyaliphatic acids which comprises carrying out the reaction between the alkali metal salt of the aromatic nuclear-substituted-hydroxy compound and the alkali metal salt of the alpha-halogenated aliphatic carboxylic acid in a reaction medium comprising water and a substantially water-insoluble organic liquid of the type described hereinabove. The present invention is based on the discovery that results which are much superior to those obtained when the organic liquid is not used, although not quite so satisfactory as those obtained by the method of Patent No. 2,480,817 wherein the reaction is carried out in the presence of such a solvent, are obtained if such a solvent is added after reaction (which may be measured by consumption of the alkali metal salt of the alpha-halogenated aliphatic carboxylic acid) is substantially complete but prior to the acidification step.

In accordance with accepted nomenclature, the term "aromatic nuclear-substituted-hydroxy compound," as used in this specification and in the appended claims, includes all such compounds whether additionally nuclearly-substituted with additional hydroxy groups or with other groups or not. Similarly the term "aryloxyaliphatic acid" as used herein includes all such compounds whether the aryl group is ring-substituted or not.

Having thus described my invention, what I claim and desire to protect by Letters Patent is:

1. The process of preparing a polychlorophenoxyacetic acid useful as a plant growth regulator which comprises reacting an alkali metal salt of a polychlorophenol and an alkali metal salt of chloroacetic acid in a reaction medium composed of water until reaction is complete, then thoroughly admixing with the resulting reaction mixture a substantially water-insoluble inert organic liquid which is a good solvent for said polychlorophenol and relatively a poor solvent for said polychlorophenoxyacetic acid and which is selected from the group consisting of hydrocarbons and halogenated hydrocarbons, then acidifying the resulting mixture while vigorously agitating it and while maintaining a temperature of from 70° to 90° C. at which the mixture is entirely liquid and subsequently cooling the mixture to below 40° C. and thereby effecting liberation of said polychlorophenoxyacetic acid and of the unreacted polychlorophenol with precipitation of most of said polychlorophenoxyacetic acid and solution of substantially all of said unreacted polychlorophenol in said organic liquid, and then separating said precipitated polychlorophenoxyacetic acid from the residual mixture, the so separated polychlorophenoxyacetic acid without further purification having a more desirable physical form and being much more free from free polychlorophenol and from colored impurities than a comparative product made by an identical process in which use of said liquid is omitted.

2. The process of preparing 2,4-dichlorophenoxyacetic acid which comprises reacting an alkali metal salt of 2,4-dichlorophenol and an alkali metal salt of chloroacetic acid in a reaction medium composed of water until reaction is complete, then thoroughly admixing with the resulting reaction mixture monochlorobenzene in amount such that the weight ratio of monochlorobenzene to water is from 1:3 to 5:1, then acidifying the resulting mixture while vigorously agitating it and while maintaining a temperature of from 70° to 90° C. at which the mixture is entirely liquid and subsequently cooling the mixture to below 40° C. and thereby effecting liberation of said 2,4-dichlorophenoxyacetic acid and of the unreacted 2,4-dichlorophenol with precipitation of most of said 2,4-dichlorophenoxyacetic acid and solution of said unreacted 2,4-dichlorophenol in said monochlorobenzene, and then separating said precipitated 2,4-dichlorophenoxyacetic acid from the residual mixture, the so separated 2,4-dichlorophenoxyacetic acid without further purification having a more desirable physical form and being much more free from free 2,4-dichlorophenol and from colored impurities than a comparative product made by an identical process in which use of said monochlorobenzene is omitted.

3. A process as set forth in claim 2 wherein the mol ratio of 2,4-dichlorophenol to chloroacetic acid in the reaction mixture ranges from 1.2:1 to 2.5:1, whereby a higher yield of 2,4-dichlorophenoxyacetic acid is obtained than would be the case if a lower mol ratio were used.

4. A process as set forth in claim 2 wherein the mol ratio of 2,4-dichlorophenol to chloroacetic acid in the reaction mixture is at least 2:1, whereby a higher yield of 2,4-dichlorophenoxyacetic acid is obtained than would be the case if a lower mol ratio were used.

JOHN C. R. WARREN.

REFERENCES CITED

The following references are of record in the file of this patent:

UNITED STATES PATENTS

| Number | Name | Date |
|---|---|---|
| 2,480,817 | Warren | Aug. 30, 1949 |

OTHER REFERENCES

Fritzsche: J. fur Prakt. Chem., vol. 128, N. F. 20, pp. 269–274 (1879).

Koelsch: J. Am. Chem. Soc., vol. 53, page 304 (1931).

Pokorny: J. Am. Chem. Soc., vol. 63, page 1768 (1941).

Lange: Handbook of Chemistry, 5th ed., Handbook Pub. Co., Inc. (1944), pp. 424–425.

Haskelberg: J. Org. Chem., vol. 12, page 427 (1947).